United States Patent
Milenkovic et al.

(10) Patent No.: US 9,252,818 B2
(45) Date of Patent: Feb. 2, 2016

(54) TRANSMITTER AND RECEIVER CIRCUITS

(71) Applicant: Lime Microsystems Ltd, Haslemere (GB)

(72) Inventors: Srdjan Milenkovic, Surrey (GB); Robin Miller, Hants (GB); Ebrahim Bushehri, London (GB)

(73) Assignee: Lime Microsystems LTD, Haslemere (GB)

( * ) Notice: Subject to any disclaimer, the term of this patent is extended or adjusted under 35 U.S.C. 154(b) by 71 days.

(21) Appl. No.: 14/085,231

(22) Filed: Nov. 20, 2013

(65) Prior Publication Data

US 2014/0235182 A1    Aug. 21, 2014

(30) Foreign Application Priority Data

Feb. 20, 2013  (GB) .................................. 1303007.7

(51) Int. Cl.
*H04B 1/38*   (2015.01)
*H04B 1/00*   (2006.01)

(52) U.S. Cl.
CPC ............ *H04B 1/0014* (2013.01); *H04B 1/0007* (2013.01)

(58) Field of Classification Search
CPC ......... H04B 1/006; H04B 1/005; H04B 10/40
USPC ................ 455/73, 560, 561, 91, 130, 131; 375/135, 146, 295, 316, 219
See application file for complete search history.

(56) References Cited

U.S. PATENT DOCUMENTS

| | | | | |
|---|---|---|---|---|
| 6,321,075 B1 * | 11/2001 | Butterfield | ............... | 455/313 |
| 7,266,352 B2 * | 9/2007 | Soe et al. | ............... | 455/209 |
| 7,593,695 B2 * | 9/2009 | Jensen | ............... | 455/76 |
| 7,636,554 B2 * | 12/2009 | Sugar et al. | ............... | 455/73 |
| 8,346,180 B2 * | 1/2013 | Kamizuma et al. | ............... | 455/73 |
| 8,483,625 B2 * | 7/2013 | Milenkovic et al. | ............... | 455/76 |

FOREIGN PATENT DOCUMENTS

| | | | |
|---|---|---|---|
| EP | 1039649 A3 | 11/2003 | |
| WO | 0007301 A3 | 2/2000 | |
| WO | 0033470 A1 | 6/2000 | |
| WO | 2005119928 A3 | 12/2005 | |

* cited by examiner

*Primary Examiner* — Sonny Trinh
(74) *Attorney, Agent, or Firm* — Fraser Clemens Martin & Miller LLC; William J. Clemens

(57) ABSTRACT

An RF transceiver apparatus has transmitter circuitry receiving transmission signals at a transmitter baseband frequency and converting the signals to a transmission frequency, and receiver circuitry receiving signals at a reception frequency and converting to a receiver baseband frequency. A first digital local oscillator and a first mixer convert between the transmitter baseband frequency and a transmitter intermediate frequency. A second digital local oscillator and a second mixer convert between a receiver intermediate frequency and the receiver baseband frequency. A third mixer frequency receives a local oscillator signal for frequency conversion between the transmitter intermediate frequency and the transmission frequency. A fourth mixer frequency receives a local oscillator signal for frequency conversion between the reception frequency and the receiver intermediate frequency. A third local oscillator produces an RF oscillator signal to the third mixer and the fourth mixer to provide the local oscillator signal.

14 Claims, 10 Drawing Sheets

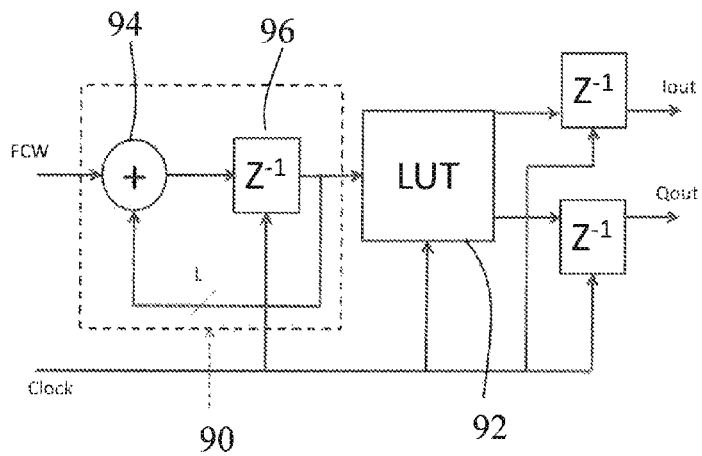
Fig. 9
Fig. 10
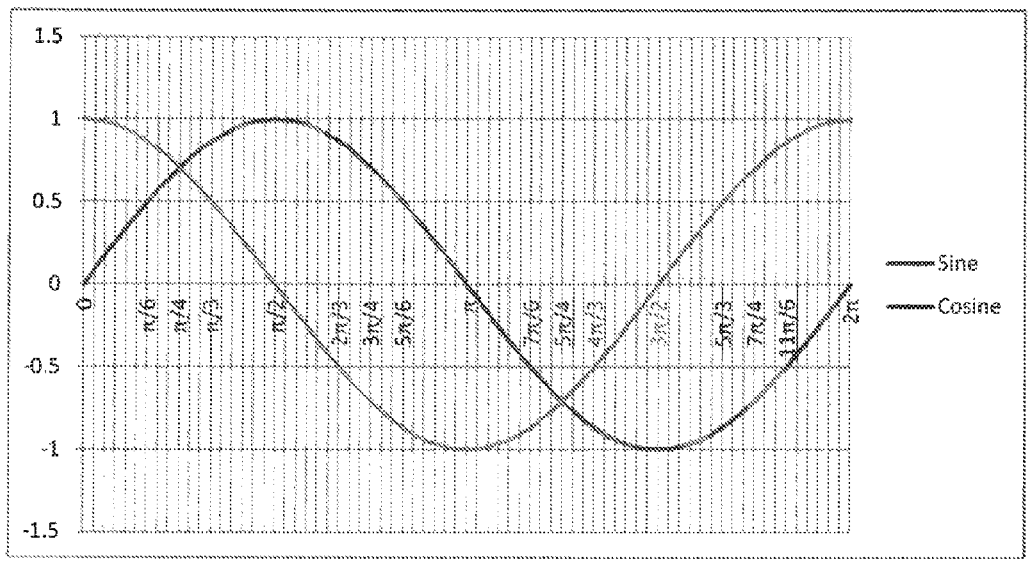

TRANSMITTER AND RECEIVER CIRCUITS

FIELD OF THE INVENTION

The present invention relates to transmitter and receiver circuits and in particular to circuits implemented partly in digital and partly in analog technology to achieve compact yet flexible circuits.

BACKGROUND TO THE INVENTION

The use of superheterodyne circuits for receivers, in which the received signal is mixed with a local oscillator signal to generate an intermediate frequency signal of above audible frequency, is well known and the invention normally attributed to Edwin H Armstrong who claimed the invention in 1918. These were originally analog technologies.

With the availability and progress of silicon integrated circuit designs, complete radio transmitters and receivers have been integrated onto silicon. The superheterodyne receiver lost favor for high frequency applications due to the narrow bandwidth and high frequency required for the intermediate frequency (IF) filter being difficult to integrate onto silicon. As a result, an architecture originally developed in 1924 by Colebrook was further developed in recent times for integration onto silicon. The homodyne architecture, otherwise known as Zero IF, is shown in the transmitter configuration in FIG. 1. In these systems the local oscillator is at the transmission frequency which allows direct conversion between the baseband and transmission frequencies. The input signal can be analog or digital in this case. The advantage of this system is the ease of integration of the channel filter, which operates at the baseband frequency, at the expense of complexity. The channel filter is a simple low-pass filter, whose bandwidth is half the RF channel bandwidth.

One disadvantage of the zero IF system (among others, including system complexity, DC offsets etc) is that local oscillator phase noise, shown in FIG. 2, degrades the quality of the data. The local oscillator noise 24 is superimposed on the received baseband signals 22 after mixing. The receiver bandwidth is twice the baseband filter 20 as shown. The oscillator noise 24 degrades the baseband signal 22, so is a critical parameter of the design.

The use of an intermediate frequency circumvents the local oscillator noise problem. Typically, the intermediate frequency is set to a frequency that is high enough so that the image frequency may be removed by RF filtering. This leads to the problem that high Q circuits are required to obtain channel selectivity. Another method to circumvent the issues of a zero IF system is to set the intermediate frequency to a frequency where filters may be implemented easily, but the channel does not include the DC component.

SUMMARY OF THE INVENTION

The present invention provides an RF transceiver apparatus comprising transmitter circuitry arranged to convert signals for transmission from a transmitter baseband frequency to a transmission frequency, and receiver circuitry arranged to convert received signals from a reception frequency to a receiver baseband frequency.

The transmitter circuitry may comprise a digital local oscillator and mixing means arranged to provide frequency conversion between the transmitter baseband frequency and a transmitter intermediate frequency.

The receiver circuitry may comprise a digital local oscillator and mixing means arranged to provide frequency conversion between a receiver intermediate frequency and a receiver baseband frequency.

The transmitter circuitry may comprise mixing means arranged to receive a local oscillator signal and provide frequency conversion of the signal for transmission between the transmitter intermediate frequency and the transmission frequency.

The receiver circuitry may comprise mixing means arranged to receive a local oscillator signal and provide frequency conversion of the received signal between the reception frequency and the receiver intermediate frequency.

The transceiver may further comprise a further local oscillator arranged to produce an RF oscillator signal which forms both of the local oscillator signals.

Indeed the present invention further provides RF transceiver apparatus comprising transmitter circuitry arranged to convert signals for transmission from a transmitter baseband frequency to a transmission frequency, and receiver circuitry arranged to convert received signals from a reception frequency to a receiver baseband frequency, wherein:

the transmitter circuitry comprises a first digital local oscillator and first mixing means arranged to provide frequency conversion between the transmitter baseband frequency and a transmitter intermediate frequency;

the receiver circuitry comprises a second digital local oscillator and second mixing means arranged to provide frequency conversion between a receiver intermediate frequency and the at least one receiver baseband frequency;

the transmitter circuitry comprises third mixing means arranged to receive a local oscillator signal and provide frequency conversion of the signal for transmission between the transmitter intermediate frequency and the transmission frequency;

the receiver circuitry comprises fourth mixing means arranged to receive a local oscillator signal and provide frequency conversion of the received signal between the reception frequency and the receiver intermediate frequency;

a third local oscillator arranged to produce an RF oscillator signal and connected to the third and fourth mixing means to provide the local oscillator signal for each of them.

One of the first and second local oscillators may be adjustable, so that the system can transmit or receive on a plurality of different frequencies. For example, one of the first and second oscillators comprises a direct digital synthesizer, which may be arranged to define a sine or cosine function in terms of Walsh function coefficients.

The third local oscillator may be formed of analog components. These can use significant space on a chip, so the use of one RF oscillator for both transmission and receiver is efficient.

One of the mixing means may comprise a complex mixer arranged to reject at least one image frequency. The complex mixer may be switchable so that the image frequency it rejects can be varied whereby the frequency it converts to, or from, can be varied.

The apparatus may further comprise a DAC having a clock input, wherein the clock input is connected to an output from the third local oscillator.

The digital local mixers may be arranged to convert signals in a plurality of different frequency bands whereby the apparatus can transmit or receive on a plurality of different channels.

The transmitter circuitry may comprise at least one further digital local oscillator and mixing means arranged to generate a further intermediate frequency signal. The third mixing means may be arranged to mix the further intermediate frequency signal with the RF local oscillator signal for transmission at a further transmission frequency.

The receiver circuitry may comprise at least one further digital local oscillator and mixing means arranged to generate a further intermediate frequency signal. The further mixing means being arranged to mix a received signal received at a further reception frequency and converted by the fourth mixing means.

Preferred embodiments of the present invention will now be described by way of example only with reference to the accompanying drawings.

BRIEF DESCRIPTION OF THE DRAWINGS

FIG. 9 is a diagram of a direct digital synthesizer (DDS) forming part of the system of FIG. 4;

FIG. 10 shows signals generated in the DDS of FIG. 9;

DESCRIPTION OF PREFERRED EMBODIMENTS OF THE INVENTION

Figure 1:
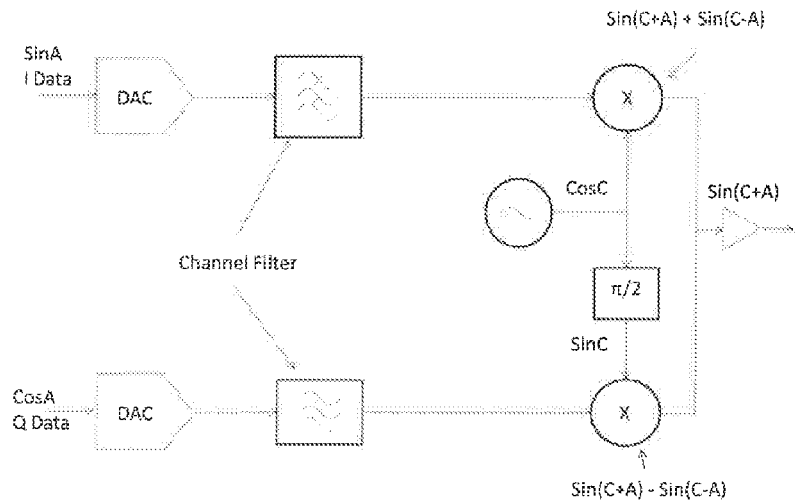
FIG. 1 is a diagram of a prior art zero-IF transmitter system.
Figure 2:
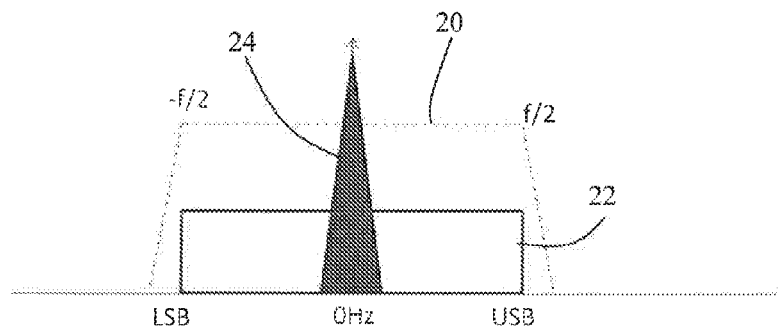
FIG. 2 shows the spectrum of a prior art zero IF baseband signal with superimposed heterodyning signal phase noise.
Figure 3:
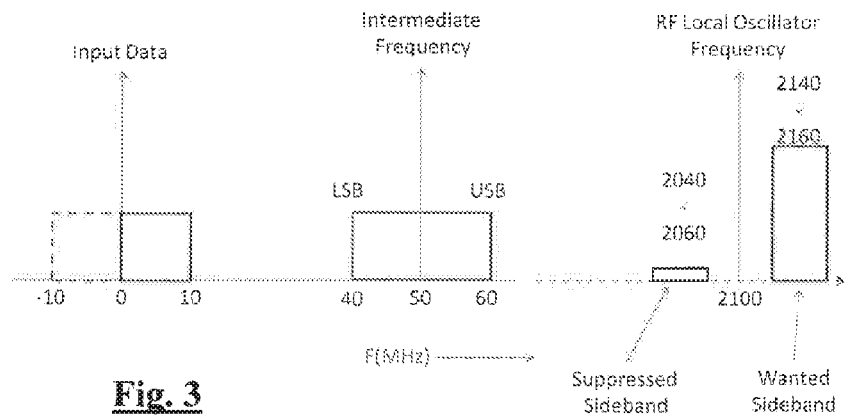
FIG. 3 is a frequency plan suitable for superheterodyne system according to an embodiment of the invention.

Referring to FIG. 3 a low IF transmitter system according to an embodiment of the invention has a baseband frequency band of 0-10 MHz, an intermediate frequency band centered on 50 MHz with a lower side band of 40-50 MHz and an upper sideband of 50-60 MHz, and an RF local oscillator with a frequency of 2100 MHz giving a lower sideband of 2040-2060 MHz and an upper sideband of 2140-2160 MHz. Either of the sidebands can be selected for transmission as will be described in more detail below. The same frequency plan may be also used for reception as well as transmission. In the case of reception, the use of a low frequency IF is practical if the receiver is sensitive to the wanted signal only and not to the image.

Figure 4:
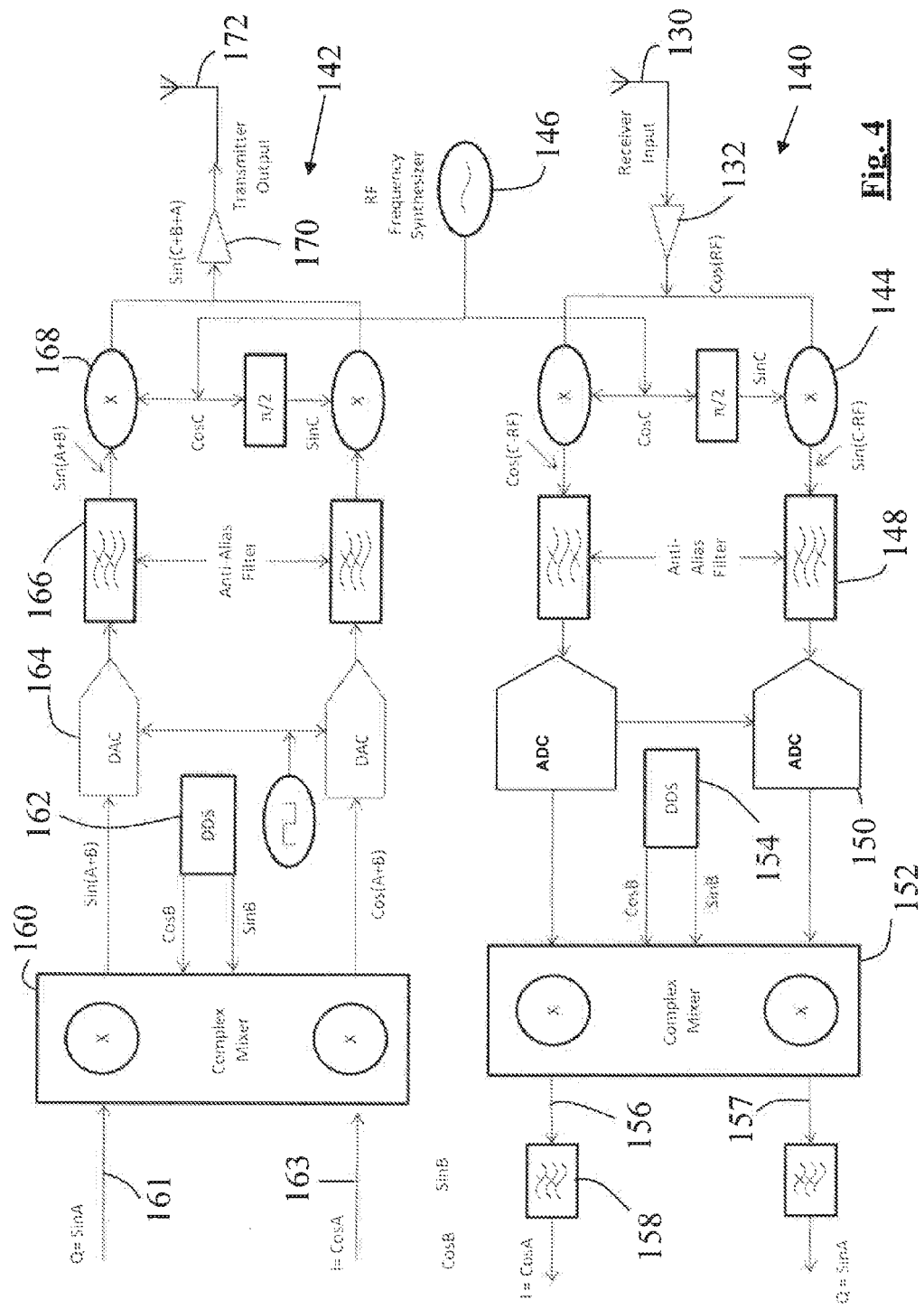
FIG. 4 is a diagram of a receiver architecture according to an embodiment of the invention.

Referring to FIG. 4 a transmitter and receiver structure of an embodiment of the invention, comprises both a receiver 140 and a transmitter 142. The receiver 140 comprises an antenna 130 arranged to receive signals and a low noise amplifier (LNA) 132 with its input connected to the antenna 130 and arranged to amplify the signal received by the antenna 130. The output of the LNA 132 is connected to the input of an analog RF section comprising mixers 144 that mix the received signal with an RF signal from a first local oscillator in the form of an RF frequency synthesizer 146 so as to convert the received signal to an intermediate frequency. Specifically there are two mixers 144 one of which mixes the received signal directly with the LO signal and one which receives the LO signal via a phase splitter which introduces a 90° delay. These mixers 144 therefore generate I and Q channel signals. For each of these I and Q channels, a respective anti-alias filter 148 is arranged to filter the IF signal before it is input to a respective ADC 150 which converts it to the digital domain. A single ADC multiplexed between the two channels could be used instead. A complex mixer 152 is connected to the output of each of the ADCs 150 and arranged to mix each of the IF digital I and Q signals with a respective signal output from a digital local oscillator 154 in the form of a direct digital synthesizer (DDS) so as to produce I and Q baseband signals. The two signals from the DDS 154 are typically 90° out of phase with each other so as to produce I and Q baseband signals on the I and Q channels 156, 157 respectively. The intermediate frequency may be zero, low or a high frequency. Channel filtering is achieved in the digital domain by means of channel filters 158 provided in the I and Q channels. Image rejection is provided by the complex mixer 152.

The intermediate frequency of the receiver may be variable, so that a number of channels at different frequencies may be monitored at the same time using the same antenna 130, LNA 132, RF local oscillator 146, and RF mixer 144. In this embodiment this is achieved by the DDS 154 having a variable frequency, which can be varied rapidly to allow the receiver to hop rapidly between RF frequencies.

The transmitter has a structure that corresponds to that of the receiver in that I and Q data channels 163, 161 are connected as inputs to a complex mixer 160 which is arranged to mix them with a signal from a digital local oscillator in the form of a DDS 162 to convert them to the intermediate frequency. The I and Q outputs of the complex mixer 160 are each connected to a respective digital to analog converter (DAC) 164. The output of each of the digital to analog converters 164 is connected to a respective anti-alias filter 166, the outputs of which are connected to respective high frequency mixers 168. The high frequency mixers 168 are also supplied with respective signals from the output of the local oscillator 146, one via a phase splitter so that the signals are 90° out of phase with each other. These RF I and Q signals are then combined, and input to a power amplifier 170 for transmission via an antenna 172. The use of the same local oscillator 146 for the transmitter and receiver systems is efficient in terms of space and cost.

The DACs 164 in the transmitter circuit have an input for a clock signal, and need a clock signal to function as is well known. In this embodiment the clock input to the DACs 164 is connected to the output of the RF local oscillator 146, so that the RF LO provides the clock signal for the DACs 164 as well as for both of the RF mixers 144, 168. In other embodiments a separate clock signal may be generated.

Figure 5:
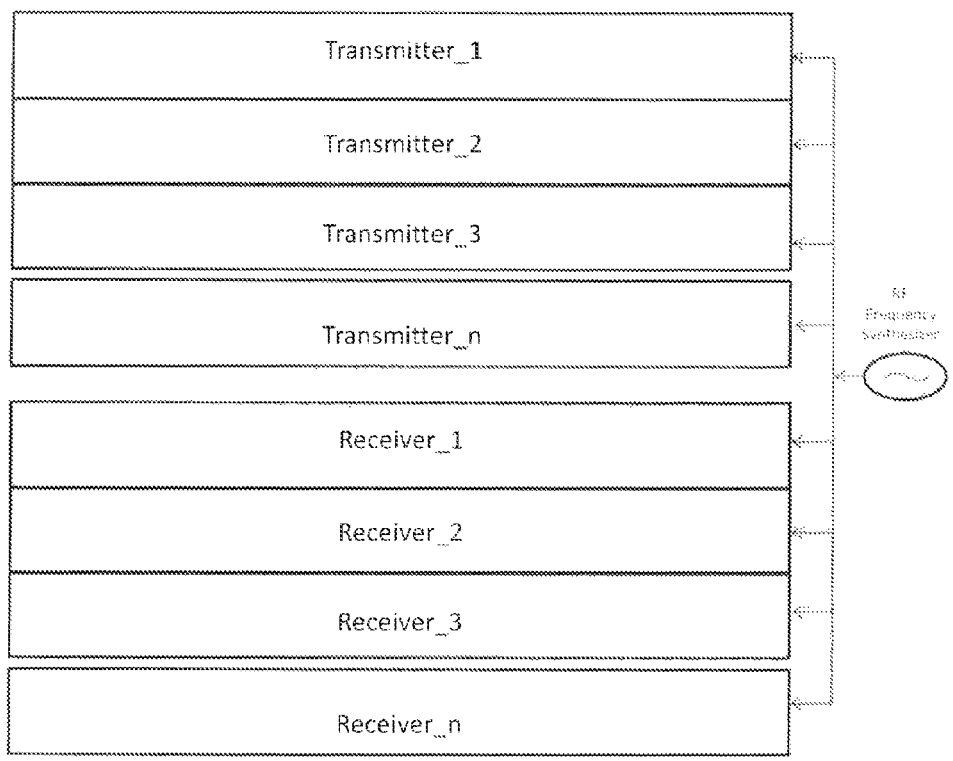
FIG. 5 is a diagram of a receiver system according to a further embodiment of the invention.

Referring to FIG. 5, in a modification to the embodiment of FIG. 4, the digital receiver circuits are repeated and connected in parallel, either before or after the analog to digital converter 150, thus providing a multiple channel receiver whilst minimizing silicon area since the analog components, which are not repeated and are common to all of the channels, consume significant silicon area. Similarly the digital transmitter circuits including or not including the DACs 164, are repeated, to give a corresponding number of transmitter channels. If multiple channels are received using the same ADC 150, as shown in this embodiment, then the advantage is the use of only one ADC for a number of channels being received.

Figure 6:
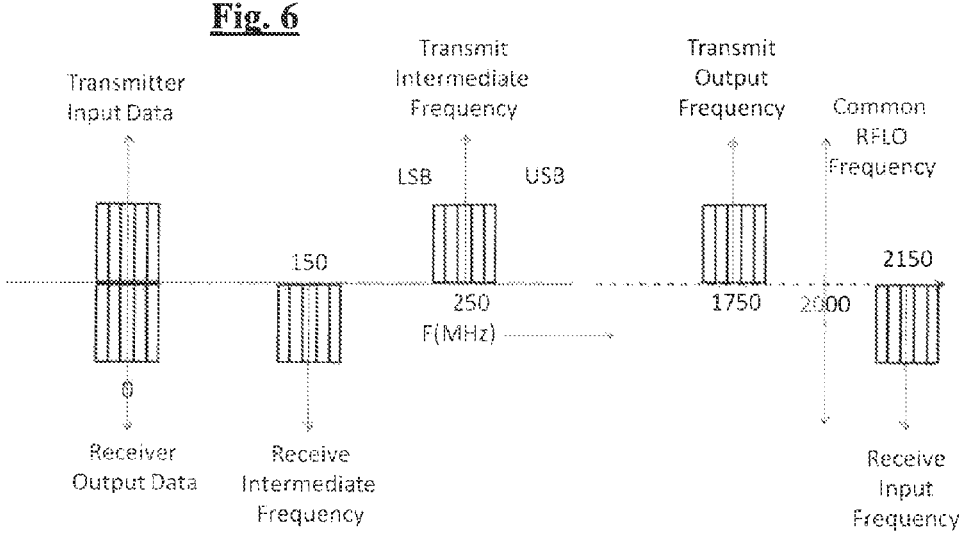
FIG. 6 is a frequency plan for the system of FIG. 4.

Referring to FIG. 6, the transmitter and receiver circuits of FIG. 4, or each of the transmitter and receiver circuits of FIG. 5, can be arranged to transmit and receive over a number of channels. In FIG. 6 the upper half of the figure shows the transmit frequencies and the lower half the receive frequencies. The baseband processor in this case is arranged to output data for transmission on a number of different channels, five in the embodiment shown, at different frequencies in the baseband. The transmitter digital LO operates at 250 MHz and the high frequency LO operates at 2 GHz. The transmitter is arranged to filter out the upper sideband and transmit around 1750 MHz. The receiver digital LO operates at 150 MHz and the receiver is arranged to receive in the upper sideband around 2150 MHz. The baseband frequencies of the receiver may be different from, or the same as, those of the transmitter. The use of different RF frequencies for transmission and reception allows both to be done simultaneously.

Figure 7:
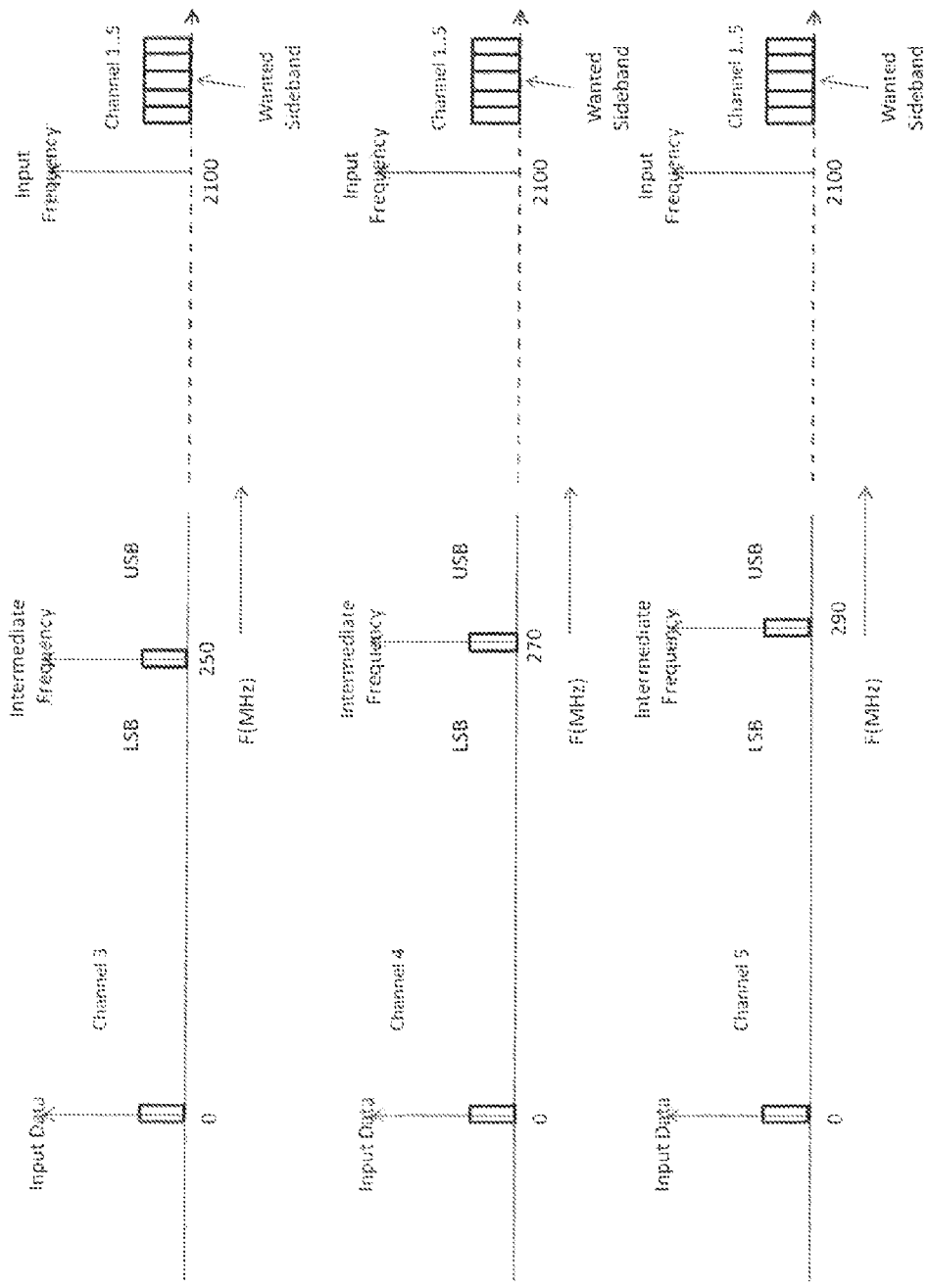
FIG. 7 is a frequency plan for a multi-channel system according to a further embodiment of the invention using common RF stages.

Referring to FIG. 7, in an alternative multi-channel system the different channels are selected by selecting the frequency of the LO in the digital complex mixer. A five-channel transmitter system is again shown. In this case the baseband frequency is the same for all channels, and the high frequency LO again operates at a fixed frequency, in this case 2100 MHz. However the DDS in the digital LO can operate at frequencies of 210, 230, 250, 270 and 290 MHz and can switch rapidly between these frequencies so that the transmitter can transmit on different channels around 2350 MHz using the upper sideband. Since the baseband IF is sufficiently wide (5× the channel width) the transmitter can transmit different data on all 5 channels simultaneously. Orthogonality is maintained in the spectral domain provided the data to the digital baseband is separated either by the use of different digital inputs or temporal (or spectral) diversity used. Channels 3, 4 and 5 of the five channel system are shown in FIG. 7. The advantage of the FIG. 6 arrangement over that of FIG. 7 is that only one ADC is used for all five channels. The disadvantage of the FIG. 6 arrangement is that a higher number of bits is required for the ADC, for the same baseband signal resolution, than in the single channel case as shown in FIG. 7.

In all of the embodiments described above, the mixers are complex mixers arranged to remove the image signal, ie to output one of the upper and lower sidebands generated by the mixing of two signals of different frequencies (the wanted signal), but to remove the other (referred to as the image signal). With transmission, this means that the transmitted signal does not include the image signal, only the wanted signal, so a complex mixer arrangement may also be used in the baseband processing part of the circuit.

Using complex 'image reject' mixers can reduce the image sensitivity in receivers and reduce the unwanted sideband in transmission. These mixers rely heavily on good balance and are complex in nature. However, with silicon integrated circuits these properties can be achieved.

Figure 8:
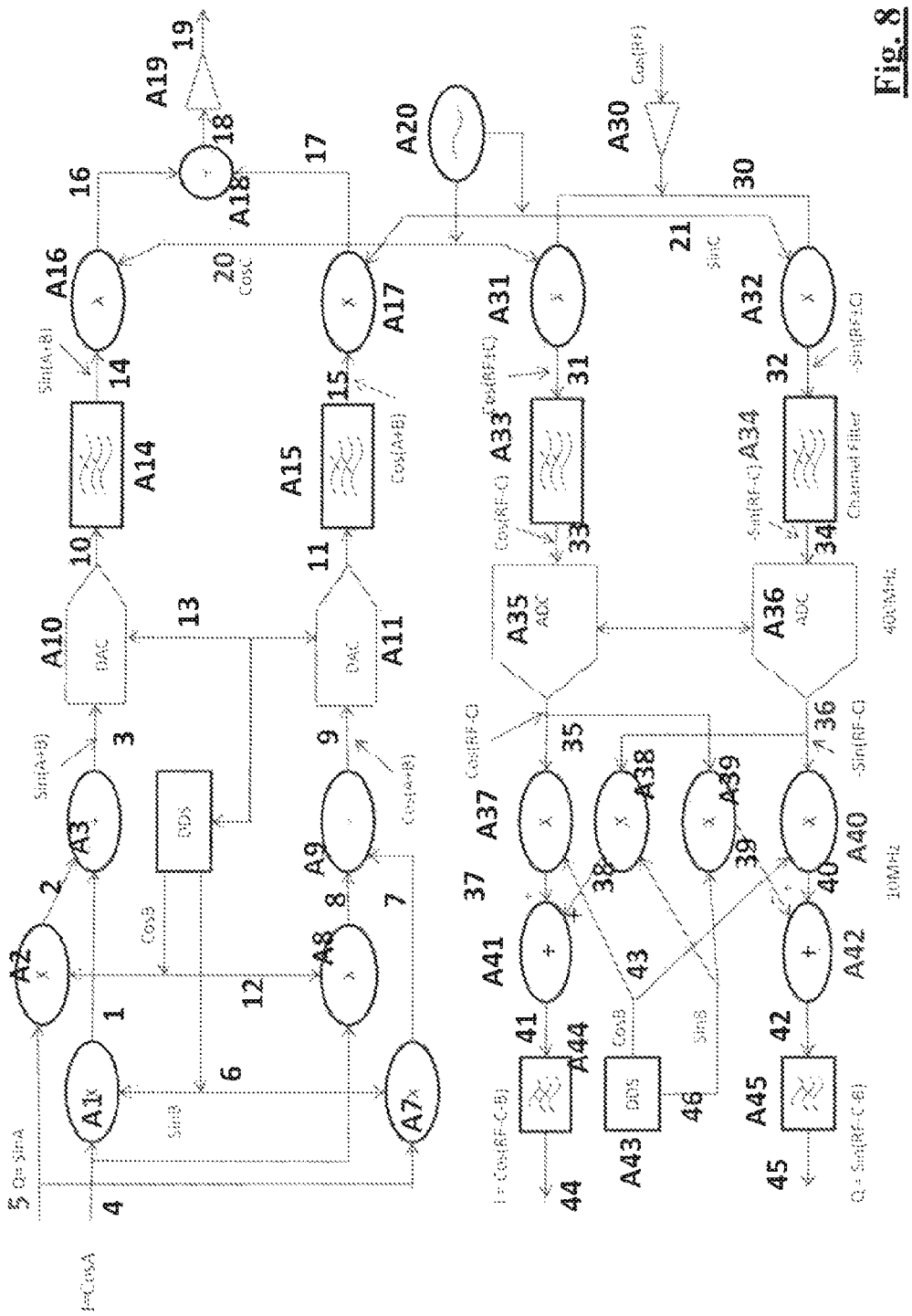
FIG. 8 is a diagram of the system of FIG. 4 showing the complex mixers of that system in more detail.

Referring to FIG. 8, the operation of the system of FIG. 4, including more detail of the structure of the system, will now be described.

The transmitter circuit 142 has a number of sections. These are a) The baseband up-converter, converting the I & Q signals to an intermediate frequency, b) DAC and anti-alias filter, and c) Final frequency upconverter.

The input data signals to the transmitter are shown as I and Q in FIG. 8. These are shown to equal Sin A and Cos A respectively.

Using simple double angle formulae, if we multiply the I signal (Cos A) by the local oscillator signal (Sin B) using mixer then signal (1) is generated:

$$\mathrm{Cos}(A)\cdot\mathrm{Sin}(B)=0.5(\mathrm{Sin}(A+B)-\mathrm{sin}(A-B)) \quad (1)$$

Similarly, if we multiply the Q signal (Sin A) by the local oscillator signal (Cos B) using mixer A2 then signal (2) is generated:

$$\mathrm{Sin}(A)\cdot\mathrm{Cos}(B)=0.5(\mathrm{Sin}(A+B)+\mathrm{Sin}(A-B)) \quad (2)$$

Adding or subtracting signals (1)+(2) above using mixer A3 gives signal (3):

$$\mathrm{Cos}(A)\cdot\mathrm{Sin}(B)+\mathrm{Sin}(A)\cdot\mathrm{Cos}(B)=\mathrm{Sin}(A+B)$$

$$\mathrm{Cos}(A)\cdot\mathrm{Sin}(B)-\mathrm{Sin}(A)\cdot\mathrm{Cos}(B)=\mathrm{Sin}(A-B) \quad (3)$$

$$\mathrm{Cos}(-A)\cdot\mathrm{Sin}(-B)=0.5(\mathrm{Sin}(-A+B)-\mathrm{Sin}(-A-B)) \quad (4)$$

$$\mathrm{Sin}(A)\cdot\mathrm{Cos}(B)=0.5(\mathrm{Sin}(-A+B)+\mathrm{Sin}(-A-B)) \quad (5)$$

$$\mathrm{Cos}(A)\cdot\mathrm{Sin}(B)+\mathrm{Sin}(A)\cdot\mathrm{Cos}(B)=\mathrm{Sin}(B-A) \quad (6)$$

So the full bandwidth is the sum of (3) and (6), i.e. Sin (B±A), depending on the phase of vector A.

To suppress the opposite sideband at high frequency, a quadrature phase component must be created using mixers A7, A8 and summer A9.

Multiplying signals using mixers A7 & A8 produces signals (7) and (8):

$$\mathrm{Sin}(A)\cdot\mathrm{Sin}(B)=0.5(\mathrm{Cos}(A-B)-\mathrm{Cos}(A+B)) \quad (7)$$

$$\mathrm{Cos}(A)\cdot\mathrm{Cos}(B)=0.5(\mathrm{Cos}(A+B)+\mathrm{Cos}(A-B)) \quad (8)$$

Subtracting or adding signals (7)+(8) above using summer A9 gives signal (9):

$$\mathrm{Cos}(A)\cdot\mathrm{Cos}(B)-\mathrm{Sin}(A)\cdot\mathrm{Sin}(B)=\mathrm{Cos}(A+B)$$

$$\mathrm{Cos}(A)\cdot\mathrm{Cos}(B)+\mathrm{Sin}(A)\cdot\mathrm{Sin}(B)=\mathrm{Cos}(A-B) \quad (9)$$

The RF bandwidth may also be shown to be =Cos(B±A).

Signals (3) and (9) are converted to analog form using digital to analog converters A10 and A11. In the example shown, the clock frequency for the DAC is derived from the same reference as that used by the DDS system. The DACs will produce signals (10) & (11) at the wanted frequency and opposite sideband alias frequency.

The alias frequencies, generated by the mixing action of the clock (13) and signals (3) and (9) (in the same way as the image signals from up- and down-converting), are filtered using filters A14 and A15, producing signals (14) and (15) comprising the signals Sin(A+B) and Cos(A+B) respectively.

The signals (14) and (15) are multiplied using multipliers A16 and A17 by the final local oscillator A20 that produces phase quadrature signals (20) and (21) to produce the output RF signal:

$$\mathrm{Sin}(A+B)\cdot\mathrm{Cos}(C)=0.5(\mathrm{Sin}(A+B+C)+\mathrm{Sin}(A+B-C)) \quad (16)$$

$$\mathrm{Cos}(A+B)\cdot\mathrm{Sin}(C)=0.5(\mathrm{Sin}(A+B+C)-\mathrm{Sin}(A+B-C)) \quad (17)$$

Adding (16)+(17) above using summer block A18 yields signal (18):

$$\mathrm{Sin}(A+B)\cdot\mathrm{Cos}(C)+\mathrm{Cos}(A+B)\cdot\mathrm{Sin}(C)=\mathrm{Sin}(A+B+C) \quad (18)$$

Similarly, the lower high frequency sideband may be obtained by subtraction:

$$\mathrm{Sin}(A+B)\cdot\mathrm{Cos}(C)-\mathrm{Cos}(A+B)\cdot\mathrm{Sin}(C)=\mathrm{Sin}(A+B-C)$$

This may be amplified by amplifier A19 to produce the RF output signal (19).

By making the adding and subtraction of the above signals programmable, at either or both of the IF and RF frequency conversion stages, any one of a number of sideband frequencies is possible, so the system can be programmed to operate at different intermediate frequencies and different RF frequencies.

The receiver circuit 140 has a number of sections. These are a) Low noise amplifier, High frequency signal generator, and mixer, converting the RF input signal to low frequency I & Q signals, b) Analog filter and Analog to digital converter, and c) Complex digital mixer and down converter to baseband quadrature related signals.

The input signals are shown as Cos(RF) in FIG. 8. The input signal Cos(RF) is normally amplified by low noise amplifier A30 to produce signal (30).

The signal (30) is multiplied by the local oscillator signal (20) and (21) using mixers A31 and A32 to generate signals (31) and (32) respectively:

$$Cos(RF)\cdot Cos(C)=0.5(Cos(RF+C)+Cos(RF-C)) \quad (31)$$

$$Cos(RF)\cdot Sin(C)=0.5(Sin(RF+C)-Sin(RF-C)) \quad (32)$$

The low pass filters A33 and A34 extract the phase quadrature components Cos(RF−C) and Sin(RF−C) (signals (33) and (34) respectively).

After passing through the ADCs A35 and A36, producing signals (35) and (36) respectively, the signals are mixed.

Using mixers A37 & A38 produces signal (37) and (38) respectively:

$$Cos(RF-C)\cdot Cos(B)=0.5(Cos(RF-C+B)+Cos(RF-C-B)) \quad (37)$$

$$Sin(RF-C)\cdot Sin(B)=-0.5(Cos(RF-C+B)-Cos(RF-C-B)) \quad (38)$$

Add signals (38)+(37) above using summer A41 gives signal (41):

$$Cos(RF-C)\cdot Cos(B)-Sin(RF-C)\cdot Sin(B)=Cos(RF-C-B) \quad (41)$$

The phase quadrature signals must also be analysed.

Using mixers A39 & A40 produces signals (39) & (40) respectively:

$$Cos(RF-C)\cdot Sin(B)=0.5(Sin(RF-C+B)-Sin(RF-C-B)) \quad (39)$$

$$Sin(RF-C)\cdot Cos(B)=-0.5(Sin(RF-C+B)+Sin(RF-C-B)) \quad (40)$$

Add signals (40)-(39) above using summer A42 gives signal (42):

$$Cos(C-RF)\cdot Cos(B)-Sin(RF-C)\cdot Sin(B)=-Sin(RF-C-B) \quad (42)$$

The case shown receives the upper sideband signal. Similarly, the lower sideband may be chosen by suitable phase selection.

These signals may be filtered if required by low pass filters A44 and A45 to produce baseband signals (44) (Cos(RF−C−B)) and (45) (Sin(RF−C−B)).

Referring to FIG. 9, a digital local oscillator suitable for use in the systems described above will now be described in more detail. The local oscillator must provide low phase noise, low spurii and must provide fine frequency adjustment to accommodate different transmit frequencies. The RF local oscillator in the system of FIG. 4 is normally generated using analog circuits, whilst the intermediate frequency local oscillator can be generated using either analog or digital methods. In this embodiment the local oscillator is arranged to use Direct Digital Synthesis method for this.

A basic Direct Digital Synthesis (DOS) system (ANAL1999) is shown in FIG. 9. It consists of two main components. These are: a) A phase accumulator 90, and b) A phase to sine magnitude converter commonly referred to as Look Up Table (LUT) 92 which generates the values of either Sine, Cosine or both.

Digital to Analog Converters may also be added to the output if analog mixing is required. In the embodiments described here the input data register (if used), mixer, and first oscillator, are all in the digital domain so DACs are not used.

The phase accumulator 90 is implemented as a digital integrator, consisting of an adder 94 and a register 96 which provides a linear change in the signal phase for Sine or Cosine output.

The DDFS output frequency is defined by frequency control word FCW and the phase accumulator word length as $$f_{out} = \frac{fcw}{2^L} f_{clk} \quad (101)$$

where
L is the phase accumulator word length
Fclk is the frequency of the clock signal
Fcw is binary value of FCW signal.
Within the limit that $$fcw \leq 2^{L-1} \quad (102)$$

By optimizing the frequency control word length, the phase accumulator length and the clock frequency, a high frequency resolution and fast frequency switching rate may be achieved.

There are two major problems limiting the use of Digital Frequency Synthesizer and DAC combination in the implementation of low power transceivers. These are: a) frequency of operation and b) power dissipation.

Both issues stem from the complexities associated with the LUT and DAC (if used). For high performance as required by transmitters in broadband applications, a high number of bits (precision) is required.

This is addressed by the application of novel compression algorithms to the LUT and, if used, utilization of noise shaped low bit DAC. The LUT compression will now be described.

For a practical implementation LUT should provide both Sine and Cosine waveforms for quadrature output which results in doubling of the hardware. The amplitude of a sine wave is symmetric from 1 to −1 around π/2 radians within the boundary 0-π/2, and the symmetry continues in that the value between 0-π is the same as the value between π and 2π, but with inverted polarity.

Similarly, the value of the sinewave (x) from π/4 to π/2 is the same as the cosine from π/4 to zero.

If the value of both cosine and sine is stored between 0 and π/4 then only one eighth of the whole cycle is stored. The value of the sine or cosine wave in any other octant may be obtained simply by sign switching and correct addressing the appropriate original octant. The values may be seen diagrammatically in FIG. 10.

Figure 11:
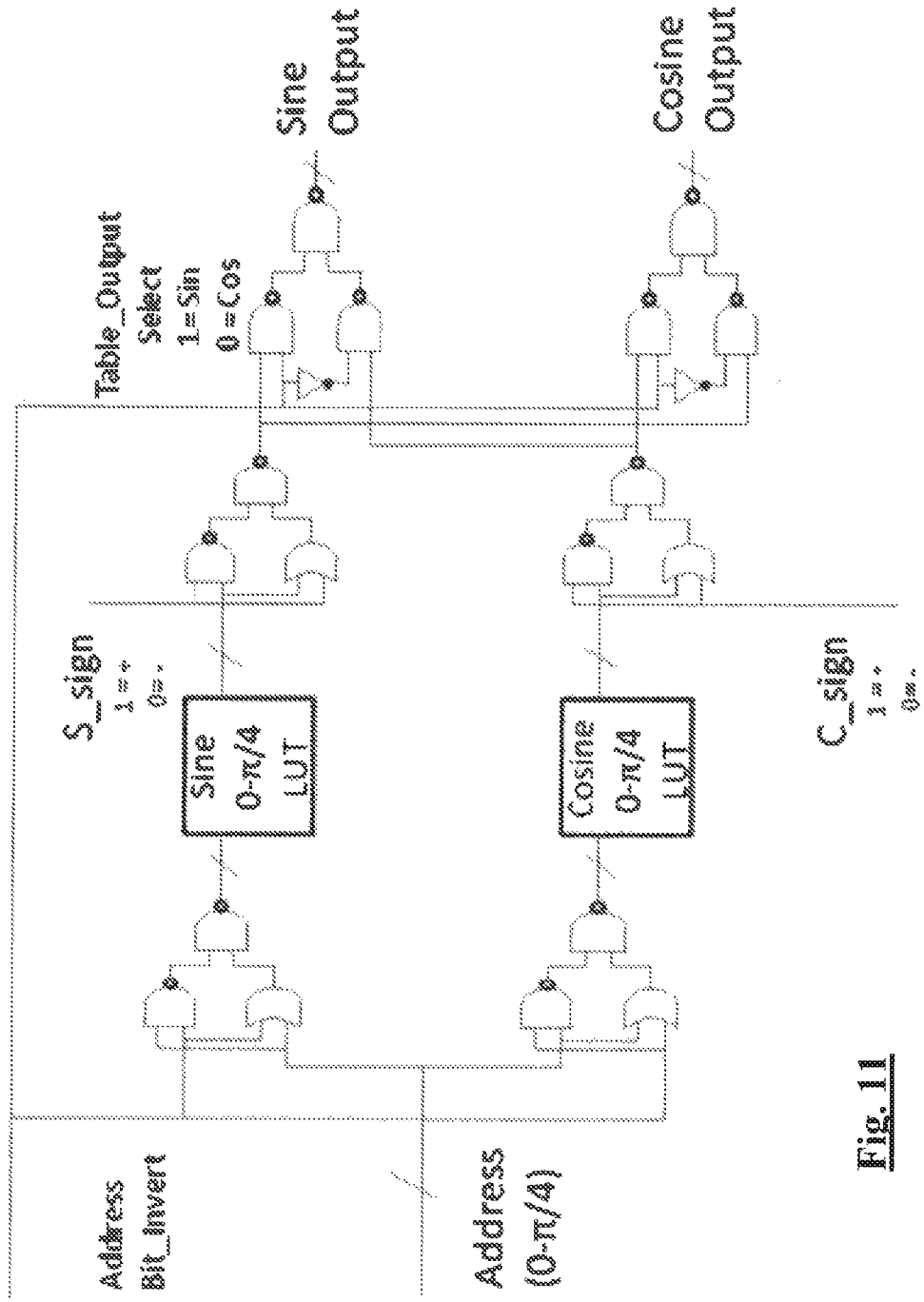
FIG. 11 shows one implementation of the DDS of FIG. 9.
Figures 12A, 12B, 12C:
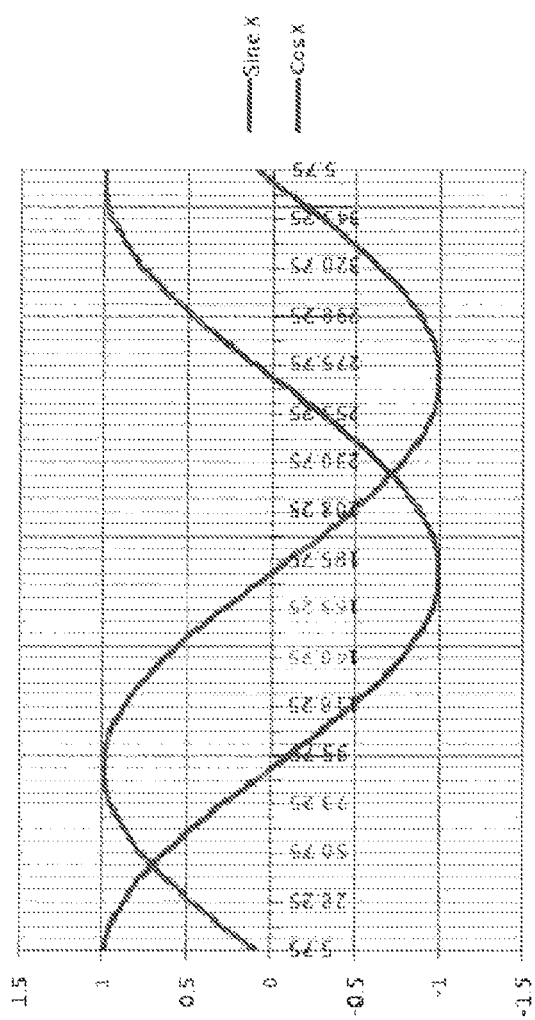
FIGS. 12a, 12b and 12c show a lookup table of the DDS of FIG. 9.

An implementation is shown in FIG. 11. In this case, three MSBs of the input phase address are used for octant coding. The signals which control phase and amplitude inversion as well as the Sine or Cosine selection signal are generated according to the phase. Quadrature signals are then generated as illustrated in, where the 3 LSB are used to select the phase used from the LUT. FIG. 12 shows a small example of the LUT that may be used in conjunction with the circuit of FIG. 11.

In this embodiment the application of Walsh functions is used for the construction of the LUT to simplify hardware complexity, a detailed description of which follows.

Walsh functions represent a set of rectangular, +1/−1 valued functions which are orthogonal to each other based on which Sine and Cosine functions can be expressed.

Walsh functions (Jaco 1977, Harm 1969) are derived from a set of Rademacher functions. Rademacher functions consist of a set of waveforms, the first of which is a constant equal to unity within a given period. The second is a square wave of unity height with the same period. Each successive Rademacher function is a square wave with half the period of the preceding one. All Rademacher functions have an odd symmetry about zero and half the period. This means that the set is incomplete since the sum of any number of functions has odd symmetry about the above points.

The Rademacher functions are combined by Walsh in order to construct a complete orthonormal set of rectangular waves. Walsh function $\Psi_B(x)$ is defined as the product of Rademacher functions as follows:

$$\Psi_B(x) = \Psi_{[b(n-1)\cdot b(n-2)\ldots b0]}(x) = r_n(x)^{b(n-1)} \cdot r_{n-1}(x)^{b(n-2)} \ldots \cdot r_1(x)^{b0} \tag{103}$$

where $$r_n(x)^{b(n-1)}, r_{n-1}(x)^{b(n-2)}, \ldots r_1(x)^{b0} \tag{104}$$

are the Rademacher functions as defined above and $B=[b_{n-1}\, b_{n-2}\, \ldots\, b_0]$ is an bit binary number where $b_i$ take binary values of 0 or 1.

Specifically, a Walsh function of index B can be calculated as a product of Rademacher functions which correspond to nonzero bits of index B. For example:

$$\Psi_0(x) = r_0(x) \tag{105}$$

$$\Psi_1(x) = r_1(x) \tag{106}$$

$$\Psi_2(x) = \Psi_{[10]}(x) = r_2(x) \tag{107}$$

$$\Psi_3(x) = \Psi_{[11]}(x) = r_2(x) \cdot r_1(x) \tag{108}$$

$$\Psi_4(x) = \Psi_{[100]}(x) = r_3(x) \tag{109}$$

$$\Psi_5(x) = \Psi_{[101]}(x) = r_3(x) \cdot r_1(x) \tag{110}$$

Figure 13:
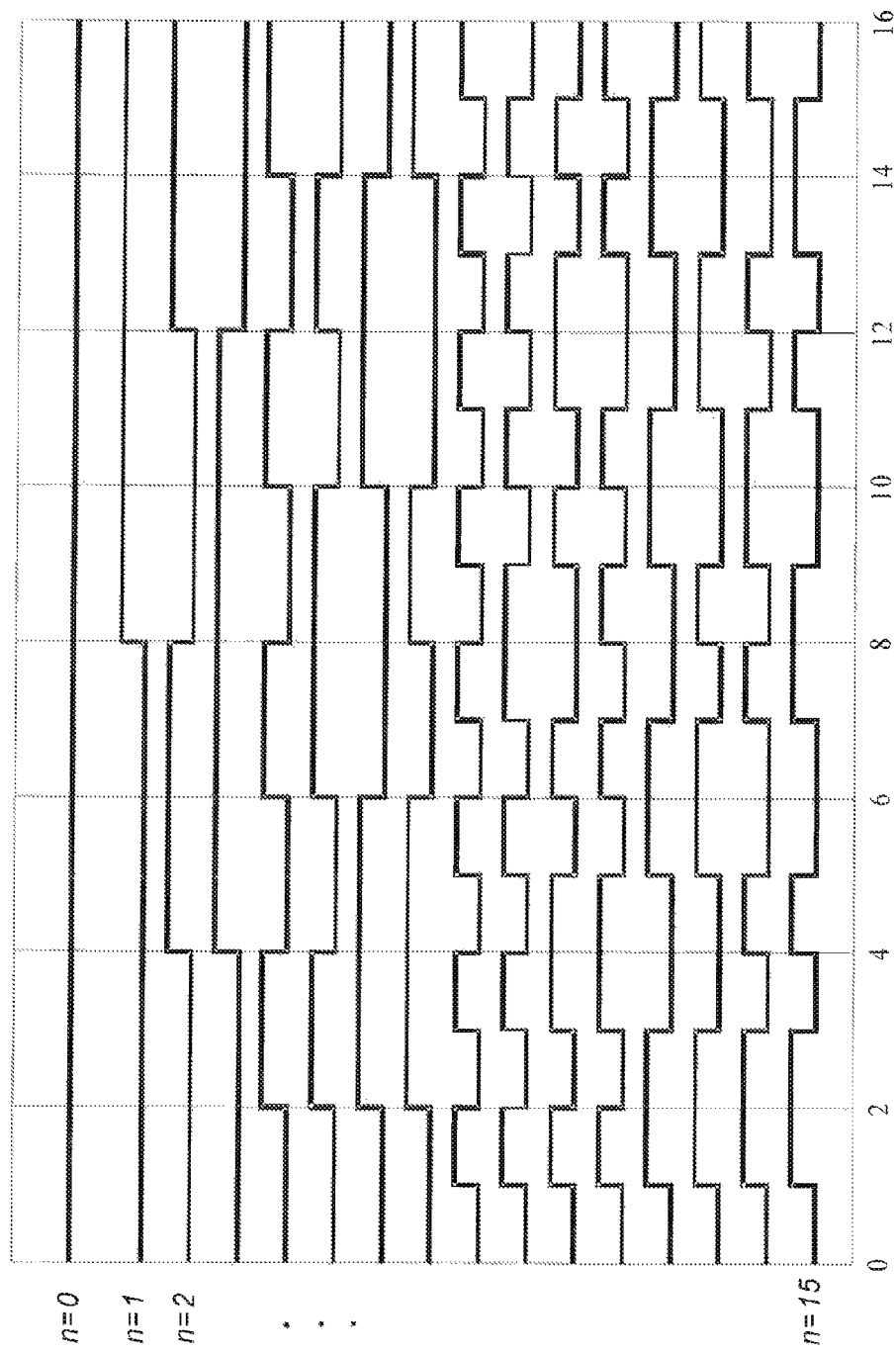
FIG. 13 shows the set of Walsh functions for period T=16.

FIG. 13 shows a set of first sixteen Walsh functions for period T=16. The set contains rectangular functions with both odd and even symmetry about x=0 and x=T/2, hence, Walsh functions form a closed set under multiplication, which means that multiplication of any two Walsh functions generates another Walsh function. However, the most important property is that the set is orthonormal, hence:

$$\int_0^T \psi_m(x)\psi_n(x)\,dx = \begin{cases} 0 & \text{for } m \neq n \\ T & \text{for } m = n \end{cases} \tag{111}$$

Based on the above properties, any function $f_{(x)}$ which can be integrated in the interval $0 \le x \le T$ can be expanded in a series of the form:

$$f(x) = \sum_{n=0}^{\infty} c_n \psi_n(x) \tag{112}$$

Combining the above equations shows that the coefficients $c_n$ can be calculated as:

$$c_n = \frac{1}{T}\int_0^T f(x)\psi_n(x)\,dx. \tag{113}$$

As a person skilled in the art would understand that the above equations are similar to Fourier transform pairs. However, these are easier simple to implement compared to the Fourier transform since Walsh functions are rectangular, and multiplications are simple to implement in hardware since $\Psi_n(x)$ values are limited to +1 or −1 only.

Referring back to FIG. 11, both the sine and cosine values are generated in the LUT for the interval 0-π/4. Therefore, the LUT's implement the following functions for both Sine and Cosine respectively:

$$f(x_i) = 2^{D_I-1} \sin\left(\frac{\pi}{4}\frac{x_i + 0.5}{2^{W-3}}\right), \tag{114}$$
$$x_i = 0, 1, \ldots, 2^{W-3} - 1$$

$$f(x_i) = 2^{D_I-1} \cos\left(\frac{\pi}{4}\frac{x_i + 0.5}{2^{W-3}}\right), \tag{115}$$
$$x_i = 0, 1, \ldots, 2^{W-3} - 1$$

In the above equations, the sine and cosine LUTs are addressed by signals (W−3) bits long. These are denoted by $x_i$. $D_I$ represents internal data path width which is normally chosen to be greater than final sine and cosine magnitude precision D. A phase offset of 0.5 LSB is added in the above formulae so that the phase inversion in FIG. 11 can be implemented using simple inverters, as indicated.

The Walsh transform coefficients for the sine and cosine functions defined by (114) and (115) can be calculated as follows.

First, in order to satisfy the periodicity requirement for the Walsh transform, functions (114) and (115) are considered periodic with the following period:

$$T = 2^{(W-3)} \tag{116}$$

Then, (24) and (25) can be expressed in discrete form:

$$f(x_i) = \sum_{n=0}^{T-1} c_n \psi_n(x_i), \tag{117}$$
$$i = 0, 1, \ldots, T-1$$
Where $$c_n = \frac{1}{T}\sum_{i=0}^{T-1} f(x_i)\psi_n(x_i), \tag{118}$$
$$n = 0, 1, \ldots, T-1$$

The Walsh coefficients are determined for both sine and cosine functions by calculating coefficients $C_n$ and setting a threshold of value θ.

All $c_n$ coefficients less than θ are removed from inverse Walsh equation (117) which significantly reduces hardware complexity of the LUTs.

The example below shows the performance achieved in the inventive approach of using Walsh functions for the construction of Sine and Cosine LUTs for frequency synthesis.

The parameters used are:
phase precision: W=19 bits,
internal data path width: DI=20 bits,
threshold: θ=2,
sine/cosine magnitude precision: D=14 bits,
based on these parameters, the following results are obtained:
number of nonzero $c_n$ sine coefficients: n=102,
number of nonzero $c_n$ cosine coefficients: n=92,
worst case spur of the output signal: −114.72 dBc.

Figure 14:
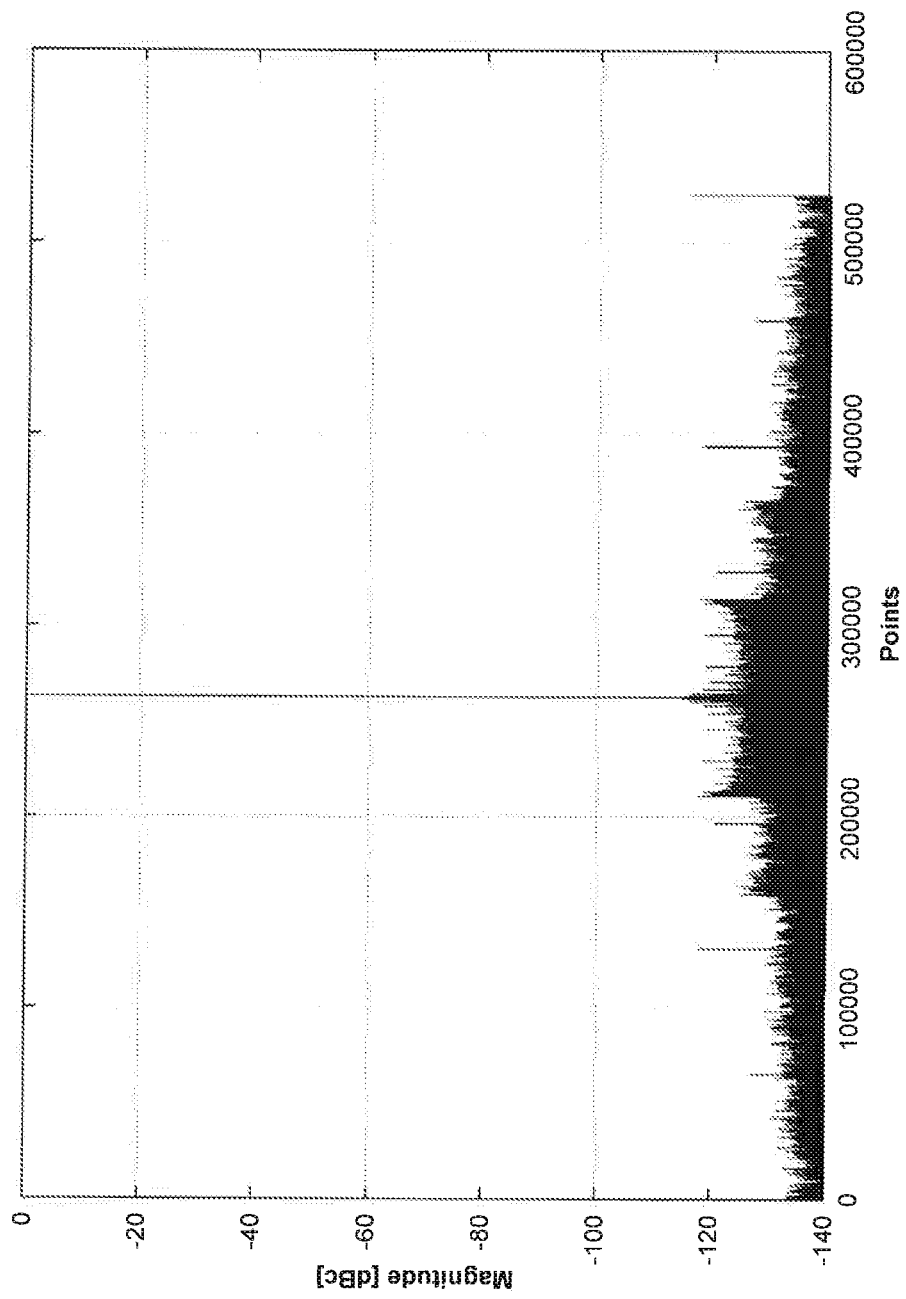
FIG. 14 shows a simulated spectrum of signals generated using Walsh functions.

FIG. 14 shows the simulated spectrum of the resulting DDFS configuration, based on the above parameters.

The spurious performance is close to the ideal 14 bit sine (−116 dBc).

After truncating the 20 bit result of the inverse Walsh transform to 14 bit output signals, the spurious performance is fully preserved.

Removing all Walsh transform coefficients with the magnitude less than θ=2 has resulted in a reduction of the number of terms in (26) from 65536 ($2^{(19-3)}=2^{16}$) sine coefficients, plus 65536 cosine coefficients to 102+92 respectively. This significantly simplifies hardware implementation of quadrature phase to sine magnitude LUTs.

It will be appreciated that the embodiments described above can be used to provide a flexible system that can be defined by the user to suit the end application whilst being fully integrated onto a single integrated circuit die.

The invention claimed is:

1. An RF transceiver apparatus comprising transmitter circuitry arranged to receive transmission signals at a transmitter baseband frequency and to convert the signals from the transmitter baseband frequency to a transmission frequency, and receiver circuitry arranged to receive signals at a reception frequency and to convert the received signals from the reception frequency to a receiver baseband frequency, wherein:
the transmitter circuitry comprises a first digital local oscillator and at least one first mixer arranged to provide frequency conversion between the transmitter baseband frequency and a transmitter intermediate frequency;
the receiver circuitry comprises a second digital local oscillator and at least one second mixer arranged to provide frequency conversion between a receiver intermediate frequency and the receiver baseband frequency;
the transmitter circuitry comprises at least one third mixer arranged to receive a local oscillator signal and provide frequency conversion of the signal for transmission between the transmitter intermediate frequency and the transmission frequency;
the receiver circuitry comprises at least one fourth mixer arranged to receive a local oscillator signal and provide frequency conversion of the received signal between the reception frequency and the receiver intermediate frequency; and
a third local oscillator arranged to produce an RF oscillator signal and connected to the at least one third mixer and the at least one fourth mixer to provide the local oscillator signal for each of them,
wherein the transmitter circuitry is arranged to receive the transmitter baseband frequency signals as I and Q signals on an I channel and a Q channel respectively, and the at least one first mixer is arranged to output I and Q signals at the transmitter intermediate frequency on an intermediate frequency I channel and an intermediate frequency Q channel respectively, and
the at least one third mixer is arranged to receive the I and Q signals on the intermediate frequency channels and to output I and Q signals on a transmission frequency I channel and a transmission frequency Q channel respectively.

2. The apparatus according to claim 1 wherein one of the first and second local oscillators is adjustable, so that the system can transmit or receive on a plurality of different frequencies.

3. The apparatus according claim 1 wherein the third local oscillator is formed of analog components.

4. RF transceiver apparatus comprising transmitter circuitry arranged to receive for transmission signals at a transmitter baseband frequency and to convert the signals from the transmitter baseband frequency to a transmission frequency, and receiver circuitry arranged to receive signals at a reception frequency and convert the received signals from the reception frequency to a receiver baseband frequency, wherein:
the transmitter circuitry comprises a first digital local oscillator and at least one first mixer arranged to provide frequency conversion between the transmitter baseband frequency and a transmitter intermediate frequency;
the receiver circuitry comprises a second digital local oscillator and at least one second mixer arranged to provide frequency conversion between a receiver intermediate frequency and the receiver baseband frequency;
the transmitter circuitry comprises at least one third mixer arranged to receive a local oscillator signal and provide frequency conversion of the signal for transmission between the transmitter intermediate frequency and the transmission frequency;
the receiver circuitry comprises at least one fourth mixer arranged to receive a local oscillator signal and provide frequency conversion of the received signal between the reception frequency and the receiver intermediate frequency; and
a third local oscillator arranged to produce an RF oscillator signal and connected to the at least one third mixer and the at least one fourth mixer to provide the local oscillator signal for each of them wherein said one of the first and second oscillators comprises a direct digital synthesizer arranged to define a sine or cosine function in terms of Walsh function coefficients.

5. RF transceiver apparatus comprising transmitter circuitry arranged to receive for transmission signals at a transmitter baseband frequency and to convert the signals from the transmitter baseband frequency to a transmission frequency, and receiver circuitry arranged to receive signals at a reception frequency and convert the received signals from the reception frequency to a receiver baseband frequency, wherein:
the transmitter circuitry comprises a first digital local oscillator and at least one first mixer arranged to provide frequency conversion between the transmitter baseband frequency and a transmitter intermediate frequency;
the receiver circuitry comprises a second digital local oscillator and at least one second mixer arranged to provide frequency conversion between a receiver intermediate frequency and the receiver baseband frequency;
the transmitter circuitry comprises at least one third mixer arranged to receive a local oscillator signal and provide frequency conversion of the signal for transmission between the transmitter intermediate frequency and the transmission frequency;
the receiver circuitry comprises at least one fourth mixer arranged to receive a local oscillator signal and provide frequency conversion of the received signal between the reception frequency and the receiver intermediate frequency; and a third local oscillator arranged to produce an RF oscillator signal and connected to the at least one third mixer and the at least one fourth mixer to provide the local oscillator signal for each of them;

wherein the transmitter circuitry is arranged to receive the baseband signals as I and Q signals on an I channel and a Q channel respectively, and the at least one first mixer is arranged to output I and Q signals at the transmitter intermediate frequency on an intermediate frequency I channel and an intermediate frequency Q channel respectively, and the first digital local oscillator is arranged to output two first local oscillator signals which are out of phase with each other, and the at least one first mixer comprises a complex mixer comprising a plurality of mixers arranged to mix the two first local oscillator signals with the I and Q channel baseband signals to generate four mixed signals, and two adders arranged to combine the mixed signals to produce I and Q channel intermediate frequency signals.

6. The apparatus according to claim 5 wherein the adders are programmable whereby the intermediate frequency can be varied.

7. RF transceiver apparatus comprising transmitter circuitry arranged to receive for transmission signals at a transmitter baseband frequency and to convert the signals from the transmitter baseband frequency to a transmission frequency, and receiver circuitry arranged to receive signals at a reception frequency and convert the received signals from the reception frequency to a receiver baseband frequency, wherein:

the transmitter circuitry comprises a first digital local oscillator and at least one first mixer arranged to provide frequency conversion between the transmitter baseband frequency and a transmitter intermediate frequency;

the receiver circuitry comprises a second digital local oscillator and at least one second mixer arranged to provide frequency conversion between a receiver intermediate frequency and the receiver baseband frequency;

the transmitter circuitry comprises at least one third mixer arranged to receive a local oscillator signal and provide frequency conversion of the signal for transmission between the transmitter intermediate frequency and the transmission frequency;

the receiver circuitry comprises at least one fourth mixer arranged to receive a local oscillator signal and provide frequency conversion of the received signal between the reception frequency and the receiver intermediate frequency;

a third local oscillator arranged to produce an RF oscillator signal and connected to the at least one third mixer and the at least one fourth mixer to provide the local oscillator signal for each of them; and a DAC having a clock input, wherein the clock input is connected to an output from the third local oscillator.

8. RF transceiver apparatus comprising transmitter circuitry arranged to receive for transmission signals at a transmitter baseband frequency and to convert the signals from the transmitter baseband frequency to a transmission frequency, and receiver circuitry arranged to receive signals at a reception frequency and convert the received signals from the reception frequency to a receiver baseband frequency, wherein:

the transmitter circuitry comprises a first digital local oscillator and at least one first mixer arranged to provide frequency conversion between the transmitter baseband frequency and a transmitter intermediate frequency;

the receiver circuitry comprises a second digital local oscillator and at least one second mixer arranged to provide frequency conversion between a receiver intermediate frequency and the receiver baseband frequency;

the transmitter circuitry comprises at least one third mixer arranged to receive a local oscillator signal and provide frequency conversion of the signal for transmission between the transmitter intermediate frequency and the transmission frequency;

the receiver circuitry comprises at least one fourth mixer arranged to receive a local oscillator signal and provide frequency conversion of the received signal between the reception frequency and the receiver intermediate frequency; and a third local oscillator arranged to produce an RF oscillator signal and connected to the at least one third mixer and the at least one fourth mixer to provide the local oscillator signal for each of them;

wherein the transmitter circuitry comprises at least one further digital local oscillator and at least one further mixer arranged to generate a further intermediate frequency signal, and the at least one third mixer is arranged to mix the further intermediate frequency signal with the RF local oscillator signal for transmission at a further transmission frequency.

9. RF transceiver apparatus comprising transmitter circuitry arranged to receive for transmission signals at a transmitter baseband frequency and to convert the signals from the transmitter baseband frequency to a transmission frequency, and receiver circuitry arranged to receive signals at a reception frequency and convert the received signals from the reception frequency to a receiver baseband frequency, wherein:

the transmitter circuitry comprises a first digital local oscillator and at least one first mixer arranged to provide frequency conversion between the transmitter baseband frequency and a transmitter intermediate frequency;

the receiver circuitry comprises a second digital local oscillator and at least one second mixer arranged to provide frequency conversion between a receiver intermediate frequency and the receiver baseband frequency;

the transmitter circuitry comprises at least one third mixer arranged to receive a local oscillator signal and provide frequency conversion of the signal for transmission between the transmitter intermediate frequency and the transmission frequency;

the receiver circuitry comprises at least one fourth mixer arranged to receive a local oscillator signal and provide frequency conversion of the received signal between the reception frequency and the receiver intermediate frequency; and a third local oscillator arranged to produce an RF oscillator signal and connected to the at least one third mixer and the at least one fourth mixer to provide the local oscillator signal for each of them;

wherein the receiver circuitry comprises at least one further digital local oscillator and at least one further mixer arranged to generate a further intermediate frequency signal, the at least one further mixer being arranged to mix a received signal received at a further reception frequency and converted by the at least one fourth mixer.

10. RF transceiver apparatus comprising transmitter circuitry arranged to receive for transmission signals at a transmitter baseband frequency and to convert the signals from the transmitter baseband frequency to a transmission frequency, and receiver circuitry arranged to receive signals at a reception frequency and convert the received signals from the reception frequency to a receiver baseband frequency, wherein:

the transmitter circuitry comprises a first digital local oscillator and at least one first mixer arranged to provide frequency conversion between the transmitter baseband frequency and a transmitter intermediate frequency;

the receiver circuitry comprises a second digital local oscillator and at least one second mixer arranged to provide frequency conversion between a receiver intermediate frequency and the receiver baseband frequency;

the transmitter circuitry comprises at least one third mixer arranged to receive a local oscillator signal and provide frequency conversion of the signal for transmission between the transmitter intermediate frequency and the transmission frequency;

the receiver circuitry comprises at least one fourth mixer arranged to receive a local oscillator signal and provide frequency conversion of the received signal between the reception frequency and the receiver intermediate frequency; and a third local oscillator arranged to produce an RF oscillator signal and connected to the at least one third mixer and the at least one fourth mixer to provide the local oscillator signal for each of them;

wherein the at least one second mixer is arranged to receive the receiver intermediate frequency signals as I and Q signals on an I channel and a Q channel respectively, and the at least one second mixer is arranged to output I and Q signals at the baseband frequency on an I channel and a Q channel respectively.

11. The apparatus according to claim 10 wherein the second digital local oscillator is arranged to output two second local oscillator signals which are out of phase with each other, and the at least one second mixer comprises a complex mixer comprising: a plurality of mixers arranged to mix the two second local oscillator signals with the I and Q channel intermediate frequency signals to generate four mixed signals, and two adders arranged to combine the mixed signals to produce I and Q channel baseband signals.

12. The apparatus according to claim 11 wherein the two adders are programmable so as to vary the frequency of the intermediate frequency signals that will be converted to the baseband frequency.

13. The apparatus according to claim 12 wherein the at least one third mixer is arranged to receive the transmitter intermediate frequency signals on respective I and Q channels, and to output I and Q RF signals on respective channels.

14. The apparatus according to claim 10 wherein the at least one fourth mixer is arranged to receive I and Q signals on respective channels, and to output the I and Q intermediate signals.

* * * * *